UNITED STATES PATENT OFFICE.

THOMAS AUSTIN MITCHELL, OF DENVER, COLORADO, ASSIGNOR TO LAFAYETTE M. HUGHES, OF DENVER, COLORADO.

METHOD OF TREATING ALUNITE.

No Drawing.  Application filed August 9, 1922. Serial No. 580,689.

This invention relates to the art of recovering commercial products from aluminous minerals and more particularly to a method of treating alunite and similar clays or ores which contain sulfates of aluminum and alkali metal for obtaining potash, alumina, and other valuable materials.

Alunite is a kind of basic alum which is given the formula:

$$K_2SO_4.Al_2(SO_4)_3.4Al(OH)_3.$$

although the term is broadly applied to a number of minerals which vary from the basic double sulfate of potassium and aluminum to various basic aluminum sulfates which contain but a small percentage of alkali. Associated with the alum are various impurities such as silica, iron oxid, etc. which are found either with the alunite or closely flanking a vein, so that separation during the mining operation is difficult. The mineral, which may be found in either crystalline or amorphous forms, is substantially insoluble in water, although the potassium and aluminum sulfates which make up the mineral are readily soluble. One type of alunite analyzes approximately as follows:—

| | | Per cent. |
|---|---|---|
| Alumina | $Al_2O_3$ | 36.00 |
| Sulfur trioxid | $SO_3$ | 37.00 |
| Potash | $K_2O$ | 10.00 |
| Sodium oxid | $Na_2O$ | .40 |
| Iron oxid | $Fe_2O_3$ | .10 |
| Silica | $SiO_2$ | 2.50 |
| Combined water | | 14.00 |
| | | 100.00 |

Owing to the presence of the sulfate group in the compound, it has been generally considered necessary to remove the sulfur content before the material could be further treated for obtaining alumina and potassium salts, and that methods suitable for the treatment of feldspar and similar silicate rocks could not be employed. A method commonly proposed is to calcine the alunite to expel the sulfuric acid anhydrid present. Upon leaching with water, potash alum passes into solution leaving a residue of alumina, the silicates, iron oxid and other insoluble impurities. This method and its various modifications which have purported to remove either all the $SO_3$ or only that part which was combined with alumina have not been commercially successful since the alumina is left in a little reactive form and does not give a pure aluminate or a high yield. Moreover, but a small part of the potash is brought to a soluble form, and a valuable portion of the numeral is not reclaimed.

In the treatment of feldspar and similar silicate bearing materials, which contain no sulfate, the use of lime mixed with various salts has been suggested, the lime being ordinarily used in an amount equivalent to the silica present to form calcium silicate. Also, it has been proposed to treat bauxite with lime to form a calcium aluminate which may be converted into the sodium compound. Along the same line it has been suggested that lime might be used in treating alunite. It was however considered necessary that the sulfur compounds should be first removed by the usual calcining operation, after which the calcined product might be again calcined with sodium carbonate and calcium oxid; but such method has not been found to be practicable. It has also been thought that if alunite were calcined with a small amount of lime and sodium chloride or potassium sulfate and carbon the potassium in the mineral would combine with the alumina as an aluminate and the lime would be unchanged. However, such impracticable or economically unfeasible suggestions have not heretofore led to the practice of a satisfactory and efficient method for directly obtaining potassium sulfate and alumina as well as other valuable products in commercial form from raw alunite.

It is accordingly an object of my invention to provide a commercially practicable and economical method of treating aluminous bearing materials which contain a sulfate, and recover therefrom in desirable forms, potash and sulfate in addition to alumina and other valuable compounds, depending upon the reagents employed.

Further objects are to improve the method of calcination so as to obtain an easily leachable calcine and thus increase the yield of dissolved products; to remove the iron and silica impurities as insoluble alkaline earth compounds, and so treat the various intermediate products as to avoid any substantial loss of free alkali; to place the alumina in a suitable condition for easy conversion to a soluble aluminate and the potash in a soluble form; and generally to provide a cyclic method of operation which will require the minimum of new reagents for the conversion of alunite and similar materials to soluble or commercially desirable products.

With these and further objects in view, as will be apparent in the following disclosure, my invention resides in the steps of a process set forth in the specification and covered by the claims appended hereto.

In the course of my experimentation I have discovered that it is feasible and desirable to employ one or more compounds of the alkaline earth metals, i. e., calcium, barium, strontium and magnesium, without the aid of other reagents in the calcination of alunite to convert the alumina of the mineral into a substance, presumably aluminate of the alkaline earth metal, from which alumina may be easily obtained, and to remove undesired impurities as alkaline earth compounds, while changing the potassium content to a soluble and recoverable form.

I, therefore, propose to calcine raw alunite intimately mixed with an alkaline earth compound which is capable of uniting with the sulfuric acid anhydrid of the mineral as well as with various silicates, iron oxid or sulfate and other reactive impurities normally associated with the alunite, and I preferably employ a carbonate material consisting solely of one or more carbonates of the alkaline earth metals for the reagent. Since the amount of alkaline earth metal material used determines the end products, I essentially provide sufficient reagent to combine with all of the aluminium content of the alunite to form an alkaline earth metal aluminate as well as enough to form compounds with the silica and other reactive impurities associated with the alunite, i. e., those which can combine with the reagent employed. These resultant alkaline earth metal silicates and iron compounds are practically insoluble in a weak solution of sodium carbonate, whereas the aluminate is thereby converted to a soluble salt; hence this method affords a simple way of separating such undesired components from the valuable materials. I furthermore provide an additional amount of the alkaline earth reagent to combine with all or part of the sulfuric acid anhydrid content in order to recover the sulfate of the mineral as a desired compound.

As a further stage in my process, I propose to employ suitable methods for dissolving and reclaiming valuable constituents of this calcined product. The water soluble materials may be first removed by dissolving in water and then, or without the preliminary water treatment, I may treat the calcined product containing the water insoluble alkaline earth metal aluminate by leaching with a solution of an alkaline metal carbonate, preferably sodium carbonate or soda ash, and thereby obtain alkali metal aluminate in solution and insoluble alkaline earth metal carbonate in the residue with the other insoluble materials. The aluminate in solution may be thrown out as aluminum hydroxid by carbon dioxid gas or by the autoprecipitation method involving the addition of a small amount of aluminum hydroxid to the solution, as is understood in this art.

As a specific example of one method within the scope of my invention, I may employ calcium carbonate or limestone as the alkaline earth metal reagent, and I mix it with the alunite in a suitable state of subdivision, and in molecular equivalent amounts, as calculated by analysis of the crude alunite, to form a mono-calcium aluminate with all of the aluminium present and to combine with all of the silica, iron oxid and such reactive impurities which are associated with the alunite. I may vary the amount of alkaline earth metal carbonate, as regards the sulfuric acid anhydrid in the alunite, to accomplish various results. As one example, I may use an additional amount of any alkaline earth metal carbonate in molecular proportions equivalent to all of the $SO_3$ present. If calcium carbonate is used, the ingredients may be in the following proportions, although these amounts may be varied depending on the analyses of the materials and practical considerations attending the operation of the process:

| | Parts by weight. |
|---|---|
| Alunite | 100 |
| Limestone | 80 |

This mixture is calcined at temperatures ranging ordinarily from 1100° C. to 1300° C. depending upon the composition of the mixture and the purity of the materials. However, I may employ temperatures outside of this range, but it is to be noted that if the temperature is as low as 900° C. the silica is not completely combined, whereas above 1400° C. there is a tendency for the mass to sinter or fuse together. Suitable apparatus and specific methods of heat treatment well known in the art may be employed. I preferably calcine the finely divided mixture in an inclined rotary kiln fired with a suitable fuel such as oil or gas and under conditions as are found best applicable to the particular material being treated, it however not being essential to employ a highly reducing atmosphere as formerly considered necessary in this art. The length, inclination and size of the kiln are also obviously determined by the time required for the travel of the material for complete treatment.

The calcining operation results in a product which is granular or porous and in an easily leachable form, it being considered that the formation of $CO_2$ gas during firing aids materially in producing this desirable condition, whereby a maximum of the soluble ingredients may be reclaimed. This carbon dioxid is preferably collected for use in a later stage to precipitate alumina and for regenerating sodium carbonate to produce a cyclic operation of the process.

While it is difficult to determine the exact nature of the dry calcined mass, it is presumed in view of the amount of calcium carbonate employed that the alumina in the calcine is present as mono-calcium aluminate. The $SO_3$ is probably combined as calcium sulfate, and the potassium may have formed an aluminate either alone or combined with calcium; also some di-calcium aluminate may be present. It however is to be noted that whatever form the calcined materials may have, the important consideration is the formation of a compound with the major portion of the alumina in the mineral which may be converted to a soluble sodium aluminate and insoluble alkaline earth metal carbonate. The potassium compounds are in such form that a large yield of soluble potassium salt may be obtained in the subsequent steps. The reactive impurities have been converted to calcium compounds, such as calcium silicate, calicum ferrate, etc.

This calcined product, which may be treated in various ways within the scope of my invention, is preferably leached with a solution of alkali metal carbonate, such as sodium carbonate, or soda ash liquor, in order to convert the water insoluble aluminum compound into a soluble sodium aluminate and this operation may be carried out in suitable apparatus. I prefer to feed the hot calcined material directly to agitators or thickeners for this purpose, the heat thus furnished tending to quicken the rate of extraction. As a result of this extraction I obtain a solution containing sodium aluminate, and sodium and potassium sulfates and carbonates and a precipitate of calcium carbonate which stays with the residues, containing calcium silicate and the iron compounds. Upon separating the filtrate from the residues the solution may be suitably treated to obtain alumina, as for example by adding carbon dioxid gas which regenerates sodium carbonate for reuse in the leaching operation and precipitates aluminum hydroxid which may be filtered off, thus leaving sodium and potassium sulfates and carbonates in solution. After separating out the sulfates, as by crystallization, the sodium carbonate may be returned to the system for repeated use. The residue containing calcium carbonate may be reused if desired in the calcination process, the calcium silicate, iron hydroxid, etc. which may be present not affecting the reaction.

As a modification of the above process, I may proportion the amount of alkaline earth metal carbonate to take care of the alumina and impurities and only that portion of the $SO_3$ which is in excess over the amount required by the potassium in the alunite. The original ingredients may be proportioned as follows:—

|  | Parts by weight. |
|---|---|
| Alunite | 100 |
| Limestone | 53 |

Calcination in this case, owing to calcium being in insufficient amount for all the $SO_3$, tends to leave the potassium sulfate unconverted or in such combined form that potassium may be recovered as a sulfate or aluminate by leaching with water, after which the remaining ingredients may be leached with a sodium carbonate solution to extract other soluble compounds, as in the first case. Treatment with carbon dioxid gas may then follow. This method allows one to separate out some of the potassium before the addition of the sodium carbonate solution.

As a third and preferred modification of my method, I propose to make use of the fact that barium sulfate is insoluble and is not materially transposed to barium carbonate by a solution of sodium carbonate, hence by using barium carbonate alone or with calcium carbonate, I am enabled to throw the sulfate out of solution as barium sulfate. According to this method, I utilize a barium compound, other than the sulfate, to form an insoluble sulfate with a part or all of the $SO_3$ which is present in the mineral. The use of barium carbonate avoids the transposition of calcium sulfate to calcium carbonate and the formation of material amounts of soluble sodium sulfate, as occurs when calcium carbonate is used alone.

As a specific application of this phase of my invention, I preferably employ limestone in sufficient amount to be equivalent to all of the alumina present, as well as the impurities. If it is desired to recover all of the potash as a carbonate, I may employ sufficient barium carbonate, such as witherite, to correspond to all the $SO_3$ in the alunite. Otherwise, I employ barium carbonate in amount equivalent to the $SO_3$ which is combined with alumina, thereby leaving sufficient $SO_3$ to form potassium sulfate during the subsequent extraction. As an example of a mixture using witherite for the excess $SO_3$ over that required by the potash, and limestone for the alumina and impurities, I may use:

|  | Parts by weight. |
|---|---|
| Alunite | 100 |
| Witherite | 60 |
| Limestone | 50 |

After calcining such a mixture, I may suitably treat it to remove valuable products. For example, I first leach out the potassium sulfate and aluminates if desired and treat the remainder, or the original calcined product as the case may be, with an alkali metal carbonate solution, such as sodium carbonate, thereby forming a solution of sodium aluminate containing more or less potassium sulfate and sodium carbonate and leaving barium sulfate and calcium carbonate in the residue.

I may also employ a magnesium compound to replace barium carbonate in whole or in part, and particularly to combine with part or all of the $SO_3$ present to form the soluble magnesium sulfate. As an example of this method, I may employ a magnesium salt to take care of the excess of $SO_3$ over that required by the potash, and preferably use magnesium carbonate combined with calcium carbonate, and may use magnesite or dolomite and limestone so proportioned as to provide the requisite amounts of the two carbonates for the reaction. For example:

| | Parts by weight. |
|---|---|
| Alunite | 100 |
| Dolomite | 56 |
| Limestone | 24 |

After calcination, the soluble magnesium sulfate and potassium sulfate may be first leached out with water before the alumina is recovered, or if this is not desired, the entire bulk may be treated directly by a solution of soda ash liquor and filtered away from the residues containing the calcium carbonate, calcium silicates and other impurities. The sulfates of potassium and magnesium may now be crystallized out, but I prefer to remove the alumina by autoprecipitation after which the sulfates may be removed by suitable methods. I then treat the mother liquor with carbon dioxid recovered from the calcining operation. It is immaterial if the desired products are not entirely removed from the sodium carbonate liquor which is to be reused, as they do not affect the subsequent leachings. The residues may be treated as desired for recovering calcium carbonate for reuse in the original mixture, thus reducing the amount of limestone to be bought and ground.

It should be understood that the process is probably more complex than as herein described and that various reactions may take place, particularly in the calcination; hence I am not to be limited by theoretical explanations herein made, and the various chemical terms used, such as mono-calcium aluminate, are to be considered as covering whatever products are formed as the result of using the specified materials in chemically equivalent proportions and treating them in the manner described. Also, such theoretical methods will be modified or not run to completion depending upon practical considerations attending the control of the various steps of the process. The examples giving calcium carbonate as the essential reagent in the calcination operation are to be considered as illustrative of the applicability of compounds of each of the alkaline earth metals, it being clear that I may substitute similar barium, strontium or magnesium compounds for the calcium carbonate specified and form aluminates thereof by reaction with the alumina of the mineral and the term "alkaline earth metal" as employed in the claims is to be so interpreted. It is also to be understood that the term "alunite" as used herein is intended to cover all sulfate bearing aluminous materials.

Having thus described my invention, what I claim as new and desire to secure by Letters Patent is:—

1. The method of treating alunite comprising the steps of mixing raw crushed alunite with an alkaline earth metal compound capable of forming a sulfate by reaction therewith, the amount of said compound present being in excess of that which is the equivalent of the aluminium in the alunite for forming an alkaline earth metal aluminate, and calcining the mixture to form an aluminate having alkaline earth metal sulfate interspersed therethrough.

2. The method of treating alunite comprising the steps of calcining it between 900° C. and 1400° C. with an alkaline earth metal carbonate proportioned in excess of the amount required to form a mono-alkaline earth metal aluminate with all of the aluminium in the mineral, and thereafter dissolving the soluble salts from the calcine and converting the aluminate to soluble recoverable form.

3. The method of treating raw alunite ore comprising the steps of mixing it solely with an alkaline earth metal carbonate proportioned in amount equivalent to the reactive impurities present in the ore and to all of the aluminium and its combined sulfate, and calcining the mixture to form alkaline earth metal sulfate and aluminate from said mineral and carbonate and insoluble compounds with the impurities associated therewith.

4. The method of treating alunite comprising the steps of mixing 100 parts by weight of raw alunite solely with at least 50 parts of alkaline earth metal carbonate and calcining the mixture between 1100° C. and 1300° C. to form recoverable aluminate and sulfate therefrom.

5. The method of treating alunite comprising the steps of mixing 100 parts by weight of alunite with at least 50 parts of limestone, and calcining the mixture between 1100° C. and 1300° C. so as to produce calcium aluminate and calcium sulfate therefrom.

6. The method of treating alunite comprising the steps of intimately mixing crushed alunite with sufficient calcium carbonate to form mono-calcium aluminate with all the aluminium present and calcium sulfate with the sulfate radical combined with aluminium in the mineral as well as calcium compounds with the reactive associated impurities, calcining this mixture to form such calcium products therefrom and convert some of the potassium content of the mineral to recoverable form and thereafter dissolving aluminium and potassium compounds from the calcine.

7. The method of treating alunite comprising the steps of mixing 100 parts by weight of the raw crushed mineral with at least 50 parts by weight of alkaline earth metal carbonate, calcining the mixture between 1100° C. and 1300° C. to form alkaline earth metal compounds thereof, leaching the calcine with sodium carbonate solution to form a soluble aluminate and to dissolve the soluble salts and thereafter recovering aluminium and potassium compounds from the solution.

8. The method of treating alunite comprising the steps of mixing the raw alunite with alkaline earth metal carbonate proportioned to be molecularly equivalent to all of the aluminium and all of the sulfate in the alunite as well as to the reactive impurities, calcining the mixture above 900° C. to form an aluminate interspersed with alkaline earth metal sulfate and thereafter dissolving and separating the aluminium and alkaline earth metal compounds.

9. The method of treating alunite comprising the steps of mixing the raw alunite with two alkaline earth metal carbonates, one being in amount equivalent to all the aluminium and its combined sulfate and the other to the remaining sulfate combined with potassium, and calcining the mixture to form alkaline earth metal aluminate interspersed with sulfate.

10. As a method of treating alunite, the steps of calcining a mixture of alunite and an alkaline earth material comprising barium carbonate to form an alkaline earth metal aluminate and barium sulfate, and thereafter dissolving the aluminate and leaving barium sulfate as a residue.

11. The method of treating alunite comprising the steps of mixing the same with calcium and barium carbonates equivalent in amount to react with all of the aluminium and sulfate content of the mineral, calcining the mixture to produce mono-alkaline earth metal aluminate and sulfate and leaching with an alkali metal carbonate solution, thereby leaving barium sulfate and calcium carbonate in the residue and forming a soluble alkali metal aluminate.

12. The method of treating alunite comprising the steps of calcining the mineral with calcium carbonate and magnesium carbonate to form an alkaline earth metal aluminate therefrom, and leaching to separate potassium and magnesium sulfates from the aluminum compound in the calcined product.

13. The method of treating alunite comprising the steps of mixing crushed alunite with calcium carbonate equivalent in amount at least to the alumina content of the alunite and magnesium carbonate equivalent in amount to a portion of the sulfate in the mineral, calcining the mixture to form alkaline earth metal aluminate and sulfate, leaching out the water soluble salts and thereafter dissolving the aluminate in the calcine.

14. As a method of treating alunite, the steps of calcining finely divided alunite and an alkaline earth metal carbonate material, comprising strontium carbonate, mixed in equivalent proportions to form an alkaline earth metal aluminate from all the aluminium present and strontium sulfate by reaction with a part of the sulfate in the mineral and thereafter leaching strontium sulfate from the calcine.

Signed at New York city, New York, this 4th day of August, 1922.

THOMAS AUSTIN MITCHELL.